Oct. 22, 1946.   I. W. SIMPKINS   2,409,908
SAFETY MECHANISM FOR BRAKES
Filed Aug. 6, 1945   3 Sheets-Sheet 1

Inventor:
Isaac W. Simpkins
By Paul B. Eaton
Attorney

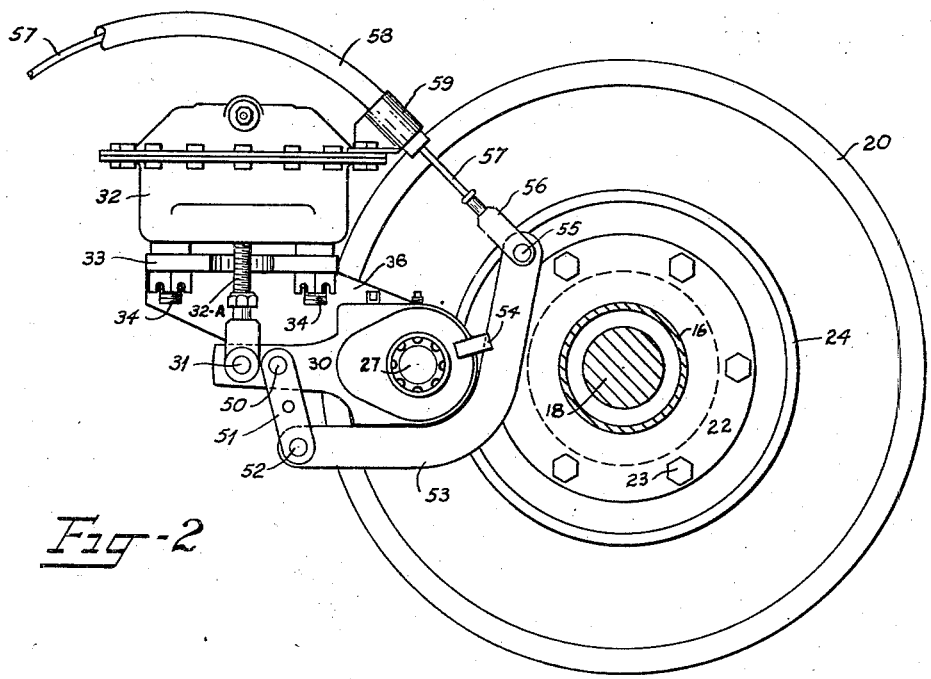
Fig-2
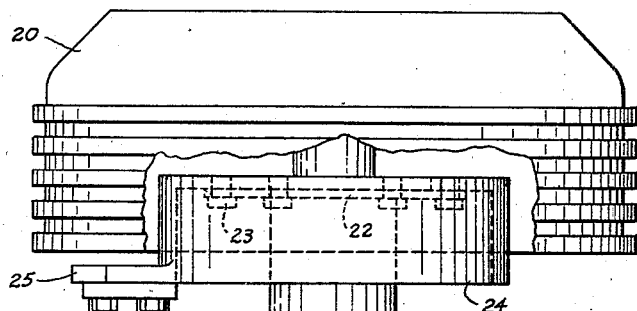
Fig-3
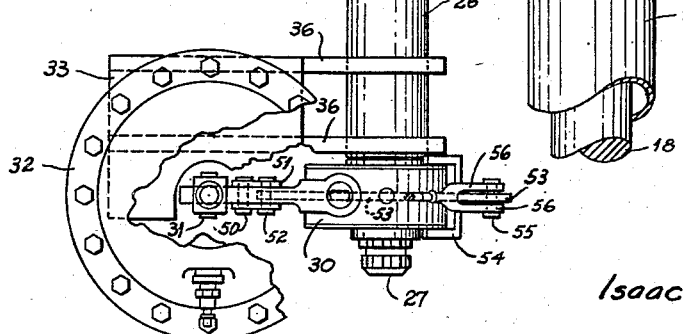
Inventor:
Isaac W. Simpkins

Oct. 22, 1946.　　　I. W. SIMPKINS　　　2,409,908
SAFETY MECHANISM FOR BRAKES
Filed Aug. 6, 1945　　　3 Sheets-Sheet 3
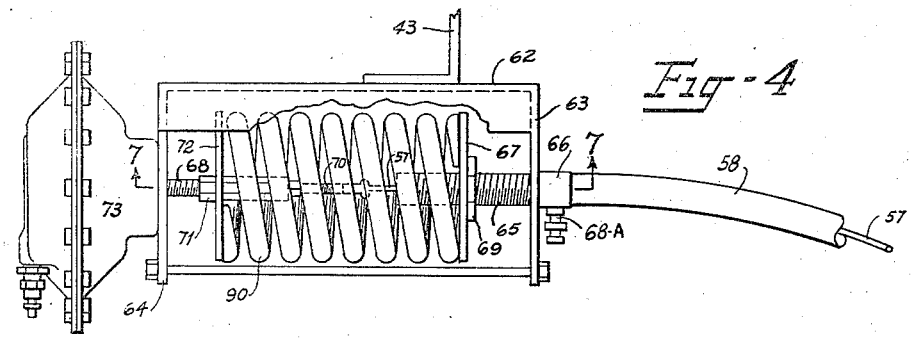
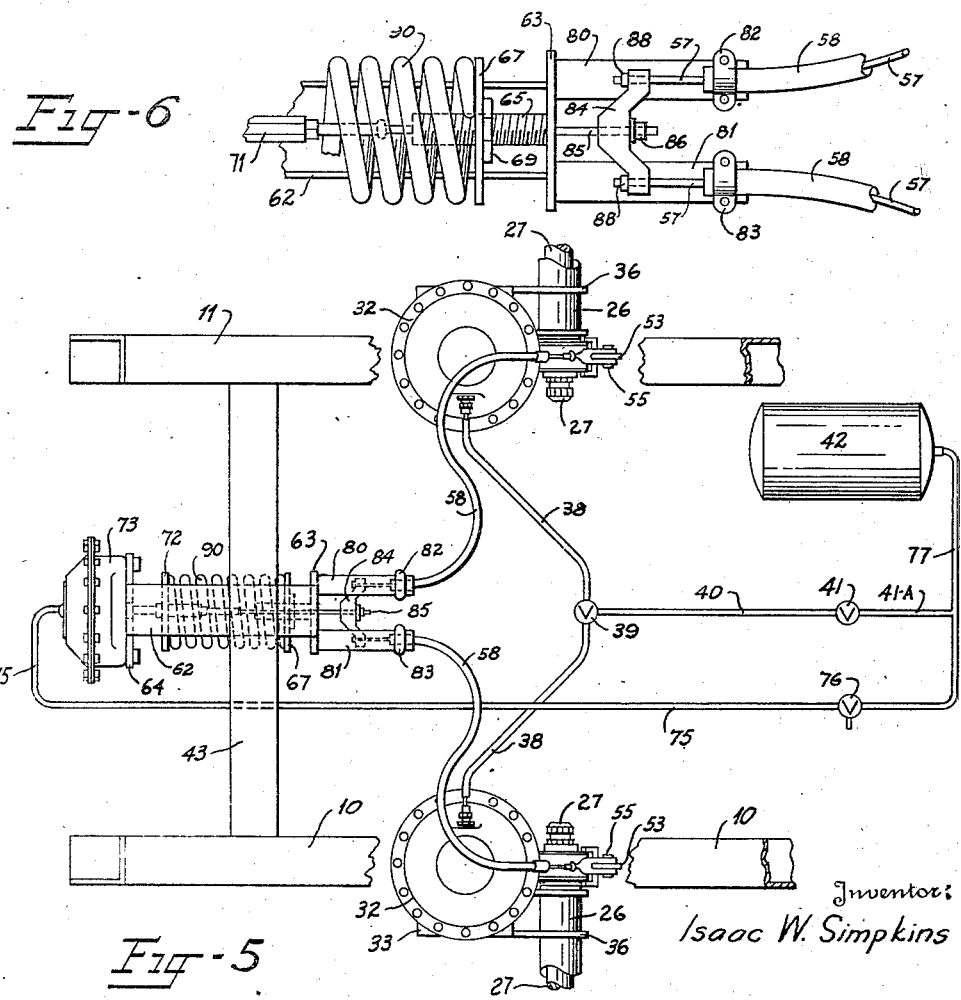
Inventor:
Isaac W. Simpkins Patented Oct. 22, 1946

2,409,908

UNITED STATES PATENT OFFICE 2,409,908

SAFETY MECHANISM FOR BRAKES

Isaac W. Simpkins, Charlotte, N. C.

Application August 6, 1945, Serial No. 609,138

2 Claims. (Cl. 188—152)

This invention relates to vehicle brakes and more especially to a safety mechanism adapted to be associated with conventional air brakes as employed on trucks, trailers, and the like. In trucks and trailers, the same are provided with a diaphragm chamber into which air is forced for operating a lever for applying the brakes. If, for any reason, there should be a failure of the compressor to keep the proper amount of pressure in the pressure storage tank, or an air leak develops and an emergency should arise, or should the driver start descending a long hill or mountain grade, he often suddenly finds that he does not have sufficient air pressure to apply the brakes. The results are sometimes disastrous in the wrecking of the tractor and trailer and the contents of same, as well as serious injury or death to the driver.

In the present invention it is proposed to provide additional means which are a combination of pneumatically-operated means and spring means adapted to cooperate with the brake mechanism of the truck, tractor, or trailer for insuring that the above-recited accidents cannot happen.

It is proposed to employ the conventional braking mechanism wherein compressed air is allowed to flow into diaphragm chambers for applying the brakes. It is also proposed to connect to the brake operating means a suitable auxiliary mechanism with a compression spring which is biased to apply the brakes but, by admitting compressed air to this auxiliary mechanism, this tendency of this spring is overcome and it is impossible for this spring to apply the brakes. However, if there should be a failure of air pressure, or a decreasing of the same, the auxiliary mechanism will tend to slowly apply the brake if the air pressure is descending slowly or, in case of an abrupt failure of air pressure, whereby the operator would be powerless to apply the brakes, the auxiliary mechanism will be automatically released and its spring which is ordinarily held in inoperative position by the air pressure will then become active and will automatically apply the brakes.

It very often happens that there is a slow leak and a gradual failure of the air pressure in the pneumatic braking system of a truck, tractor, or trailer and the driver does not realize same until it is too late. Through the improved mechanism of this invention, the brakes in such instances will gradually be applied which would tell the driver that he is pulling an extra load and he would stop to investigate before it was too late to avoid a serious accident.

It is an object of this invention to provide in a pneumatically operated brake mechanism for trucks, tractors, trailers and the like equipped with pneumatically operated means for allowing compressed air to flow into the diaphragm mechanism for applying the brakes, to also supply an auxiliary mechanism connected to the brakes and equipped with a compression spring normally biased to apply the brakes but such compression spring being held compressed and prevented from applying the brakes by the pneumatic pressure in the brake mechanism.

It is another object of this invention to provide in a braking mechanism having means for applying brakes by the admission of compressed air to the braking system, an auxiliary means also operated by compressed air and normally holding the brakes in unapplied position, but having means whereby upon the failure or lowering of the air pressure, the brakes are automatically applied by means of this auxiliary mechanism.

Some of the objects of the invention having been stated, other objects will appear as the description proceeds when taken in connection with the accompanying drawings in which:

Figure 2 is a view mostly in elevation and partly in section and taken along the line 2—2 in Figure 1;

Figure 3 is a top plan view of Figure 2 with parts broken away and showing the mechanism appearing in the upper left central portion of Figure 1 on an enlarged scale;

Figure 4 is an elevational view on an enlarged scale and taken along the line 4—4 in Figure 1;

Figure 5 is a top plan view similar to Figure 1 but showing a modified form of the invention;

Figure 6 is a bottom plan view of the right end portion of the mechanism shown in the left central portion of Figure 5;

Figure 7 is a longitudinal sectional view taken along the line 7—7 in Figure 4.

Figure 1:
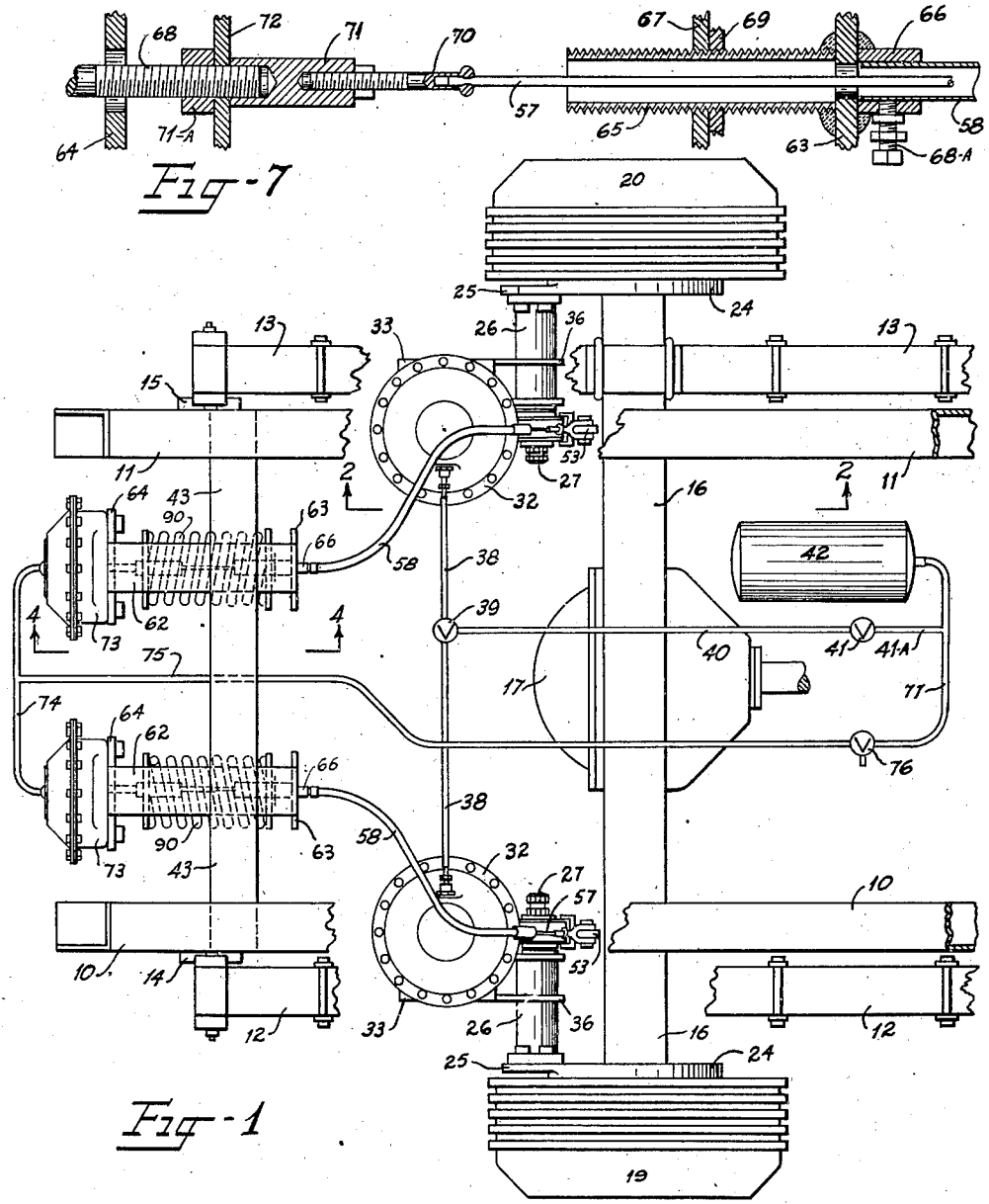
Figure 1 is a top plan view of a portion of the rear end of the chassis of a truck or trailer and showing my invention applied thereto.

Referring more specifically to the drawings, the numerals 10 and 11 indicate the side frame members of the chassis of a truck, trailer and the like which are connected to the two ends of suitable springs 12 and 13 in a conventional manner as at 14 and 15, only one end connection between the springs and the chassis member being shown but the same is true at the other end of the springs, this being a conventional structure.

These springs are supported intermediate their ends in a conventional manner on an axle housing 16. The axle housing has a conventional differential mechanism 17 connected with the axle housing, and suitable axles 18 extend out of each end of the axle housing and have suitable brake drums 19 and 20 mounted thereon, these brake drums being adapted to have secured thereto suitable wheels (not shown). In case the brakes are on a trailer, no differential would be necessary and the brake would be supported by an ordinary rigid axle.

The axle housing 16 near each end thereof has integral therewith suitable flanges 22 to which is secured by means of suitable bolts such as 23 a cup-shaped member 24 which has an annular rim portion around its exterior. This member 24 has a projection 25 to which is bolted a bearing portion 26. This bearing portion 26 has oscillatably mounted therein a shaft 27 which extends into the braking mechanism and its outer end is disposed between the free ends of the brake shoes (not shown) and has a conventional double ended cam thereon (not shown) disposed between the free ends of the brake shoes, for expanding the brake shoes to apply the brakes. All of this brake shoe mechanism is conventional and is not shown.

Suitably secured on the inner end of shaft 27 is a lever 30 which has pivotally connected to the free end thereof as at 31 a diaphragm piston 32—A, the upper end of which is connected in a conventional manner to a conventional diaphragm (not shown) disposed in a diaphragm housing 32. The diaphragm housing 32 is mounted on top of a plate 33 by means of suitable bolts 34, said plate being welded or otherwise suitably secured to a bracket 36 whose legs are welded to the bearing 26.

As the above description is given for one side of the apparatus, which side is identical to the other side, like reference characters will apply except that the parts are arranged opposite hand.

The pipes 38 are connected to a conventional quick release valve 39 and leading from this valve 39 is a pipe 40 which leads to a control valve such as a foot operated valve 41 in the cab of the driver for admitting air to the diaphragm housings for applying the brakes. The compressed air is contained in a suitable reservoir 42.

The chassis also embodies a plurality of cross bars or channel members 43 only one of which is shown in the drawings. The compressed air tank 42 and valve 41 are schematically shown as they are usually located in a part of the chassis remote from the brake mechanism and the valve 41 is usually a foot operated valve controlled by a pedal in the driver's compartment.

The above-described mechanism is conventional and it is with this mechanism that the additional auxiliary safety mechanism is adapted to operate.

Pivotally secured as at 50 to an intermediate portion of lever 30 is a link 51 which is pivotally connected as at 52 to a curved link 53 which loosely rests against the curvature of the hub of lever 30. A U-shaped member 54 is welded to link 53 and its legs slidably fit against the sides of the hub portion of lever 30. The upper end of the link 53 has pivotally connected thereto as at 55 a fitting 56 to which is rigidly connected one end of a flexible cable 57. This flexible cable slidably passes through a flexible tube 58. The end of the tube adjacent the brake mechanism is fixedly mounted in a clamp 59 secured to the diaphragm housing 32.

Secured to the lower surface of cross strut 43 by welding or the like is an inverted U-shaped bracket 62 having vertically disposed legs 63 and 64. Fixedly mounted on leg 63 by welding or the like is a threaded tube 65. Tube 58 has a fitting 66 thereon which is secured by welding or the like to leg 63. The flexible tube 58 is secured in fitting 66 by means of set screw 68—A. The tube 65 has threadably mounted thereon a plate 67 and a lock nut 69.

The tube 65 has passing therethrough the flexible cable 57, and this flexible cable 57 is fixedly secured to a shaft 70. The shaft 70 is threadably secured in an adapter 71 having a disk 72 fitting against its other end, and diaphragm piston 68 has one end threadably mounted in the other end of adapter 71, and a nut 71—A secures disk 72 between adapter 71 and the nut 71—A. The piston rod extends into a diaphragm housing 73 where it is connected to a conventional diaphragm.

The two mechanisms shown in Figure 1, one of which has just been described, are identical and like reference characters will apply. Connected to diaphragm housing 73 is a pipe 74 which has connected thereto a pipe 75 which leads to the cab of the driver and has a three way valve 76 disposed inside the driver's cab, and a pipe 77 leads to the other side of the three way valve 76 to the source of compressed air 42, pipe 41—A being also connected to pipe 77 after leaving valve 41.

In the form of invention just described, duplicate mechanisms are disposed on each wheel and duplicate auxiliary brake applying mechanisms are shown having similar reference characters as the parts are identical. Instead of having two of the auxiliary brake applying mechanisms which become operative when the air pressure falls below a predetermined point, it is entirely feasible to have only one of these but with a connection to both of the brake operating mechanisms. In Figures 5 and 6 such an arrangement is shown in which like reference characters indicate corresponding parts. The main difference in this mechanism shown in Figures 5 and 6 is that the leg 63 of inverted U-shaped bracket 62 has in turn two brackets 80 and 81 welded at one end to the exterior surface of the leg 63. The outer ends of these brackets 80 and 81 have each clamps 82 and 83 on their lower surfaces which clampingly hold the end of the two flexible tubes 58, and the two flexible cables 57, instead of being joined to the individual ends as in Figure 1, are both joined to a cross member 84 and a cable 85 is secured to shaft 70 (in the same manner as shown in Figures 4 and 7) and slidably penetrates the tube 65 and has a collar 86 which prevents the member 84 from moving off the end of the cable 85. The extreme ends of the cable 57 penetrate the ends of the member 84 and are suitably anchored by having collars 88 secured thereon.

In both forms of the invention there is disposed between the disks 75 and 67 a compression spring 90, and disk 67 being adjustable along tube 65 by means of nut 69 threadably mounted on tube 65 enables the strength of the spring 90 to be regulated.

When suitable pressure is present in diaphragm casing 73 the spring or springs 90 will be compressed and will allow the cable 57 to move toward the brake mechanism to apply no force whatever on the braking mechanism. However, when there is a failure in the compressed air system, this pressure will not be exerted on the springs 90, or a spring 90 in the case of Figures 5 and 6. This will allow the brakes to be applied automatically by spring or springs 90.

It is thus seen that the manual valve 76 in the cab of the driver can be manipulated instead of the foot lever to apply the brakes, such as when stopping at a traffic light and the like, by merely venting the air from the diaphragm cylinders 73 which allows the spring 90 to apply the brakes. Also, in the event that the foot valve 41 is in operation to apply the brakes by admitting air to the diaphragm housings 32 and sufficient pressure should not be present to apply enough brakes, the force applied by diaphragm pistons 32—A can be supplemented by also opening three-way valve 76 to allow the springs 90 to assist in the braking operation.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a vehicle having a pair of wheels equipped with conventional brakes having a brake lever and a diaphragm housing and piston connected to the lever and having a source of fluid under pressure for admission to the diaphragm housing for moving the lever to apply the brakes, a second lever connected to the first lever and having a cable extending therefrom, a compression spring secured to the cable and normally tending to move the brake lever to apply the brakes, a connection between the spring and the source of compressed fluid for normally holding the spring against actuation of the second lever as long as a predetermined pressure is present in the source of compressed fluid.

2. In a vehicle having a pair of wheels equipped with conventional brakes having a brake lever and a diaphragm housing and piston connected to the lever and having a source of fluid under pressure for admission to the diaphragm housing for moving the lever to apply the brakes, a second lever connected to the first lever and having a cable extending therefrom, a compression spring secured to the cable and normally tending to move the brake lever to apply the brakes, a connection between the spring and the source of compressed fluid for normally holding the spring against actuation of the second lever as long as a predetermined pressure is present in the source of compressed fluid, and means for breaking the connection between the spring means and the source of compressed fluid to allow the spring means to apply the brakes.

ISAAC W. SIMPKINS.